United States Patent [19]

Cull et al.

[11] 3,868,397

[45] Feb. 25, 1975

[54] PROCESS FOR PREPARATION OF CHLORENDIC ANHYDRIDE

[75] Inventors: Jay A. Cull, Williamsville; Walter M. Zimberg, Tonawanda, both of N.Y.

[73] Assignee: Hooker Chemicals & Plastics Corp., Niagara Falls, N.Y.

[22] Filed: May 1, 1972

[21] Appl. No.: 249,036

[52] U.S. Cl. ............................................. 260/346.6
[51] Int. Cl. ...................... C07c 61/28, C07c 61/26
[58] Field of Search ...................... 260/346.3, 346.6

[56] References Cited
UNITED STATES PATENTS

| | | | |
|---|---|---|---|
| 2,598,562 | 5/1952 | Kleiman | 260/346.6 |
| 2,903,463 | 9/1959 | Baranauckas et al. | 260/346.6 |
| 3,214,444 | 10/1965 | Timmer, Jr. et al. | 260/346.6 |

*Primary Examiner*—Henry R. Jiles
*Assistant Examiner*—Bernard L. Dentz
*Attorney, Agent, or Firm*—Peter F. Casella; James F. Mudd

[57] ABSTRACT

An improved process for the preparation of chlorendic anhydride follows from the reaction of ultra high purity hexachlorocyclopentadiene and maleic anhydride preferably in the presence of less than about ten percent by weight of an organic solvent. The chlorendic anhydride obtained can be used directly to prepare polyester resins.

6 Claims, No Drawings

PROCESS FOR PREPARATION OF CHLORENDIC ANHYDRIDE

BACKGROUND OF INVENTION

This invention relates to the manufacture of chlorendic anhydride, and is more particularly concerned with making chlorendic anhydride having desirable high purity. Chlorendic anhydride, also known as hexachloro-endomethylene tetrahydrophthalic anhydride, is 1,4,5,-6,7,7-hexachlorobicyclo-(2.2.1)-5-heptene-2,3-dicarboxylic anhydride, and in this specification will be referred to as "chlorendic anhydride" for brevity.

According to the prior art, chlorendic anhydride is formed by the reaction of hexachlorocyclopentadiene and maleic anhydride in refluxing xylene solution and is described in U.S. Pat No. 2,606,910 issued to Herzfeld et al. Chlorendic acid, the product formed by the hydrolysis of the anhydride, is a dibasic acid containing a large amount of stable chlorine and has found use on a commercial scale for preparing fire-resistant polyester resins.

In Prill, JACS 69, 62 (1947), hexachlorocyclopentadiene and maleic anhydride were reacted in the presence of toluene to form the adduct. Unreacted hexachlorocyclopentadiene and toluene were removed by steam distillation. The dicarboxylic acid resulting from hydrolysis of the adduct was mostly in the form of a heavy oil layer in the distillation residue (about 1500 milliters of water), and crystallized on cooling to room temperature. It is stated that the product was purified by recrystallization from water or toluene. No data on yield or purity of the product are given.

Chlorendic anhydride prepared by the methods described in the prior art requires multi-recrystallization to produce a product having desirable color characteristics. In addition, when operating according to the procedure of Prill, steam distillation of the reaction mixture is time consuming as hexachlorocyclopentadiene steam distills slowly, tends to develop color in the mother liquor and the colored impurities are soluble in water and chlorendic acid. Further the use of two solvents, namely toluene for the condensation reaction and water for the crystallization step, requires a complicated recovery system for the solvents.

U.S. Pat. No. 2,903,464 discloses an improved process for the preparation of chlorendic anhydride of desirable purity and color characteristics by reacting hexachlorocyclopentadiene and maleic anhydride at an elevated temperature in a chlorinated benzene solvent. In this process, the chlorendic anhydride product crystallizes from the reaction solvent which retains substantially all of the impurities and a small but significant amount of the anhydride product. This mother liquor must be recovered, e.g., by distillation, to separate therefrom the impurities and retained chlorendic anhydride prior to reuse. Such recovery procedures adds to the cost and time required for the large scale production of chlorendic anhydride.

It is among the principal objects of this invention to provide a method for the production and recovery of chlorendic anhydride which is direct and simple and which is readily adaptable to large scale commercial operations. A further object is to provide a method for the production and recovery of chlorendic anhydride where the product obtained is suitable for the manufacture of high-grade resins, e.g., light-colored polyester resins and for hardening epoxy resins.

A further object is to provide a process for the production of chlorendic anhydride which does not involve the use of large volumes of organic solvents or water and the expense and effort of recovering large volumes of organic solvent. Other objects will become apparent to those skilled in the art on consideration of the complete specification and claims.

SUMMARY OF THE INVENTION

A new and useful method for making chlorendic anhydride of high purity by a simple and direct process has been found which process does not involve the use of large volumes of organic solvent in the condensation step. Moreover, by the process of this invention, chlorendic anhydride is obtained directly, in high yield and high purity, from the condensation step. The crystallization step, which characterized the prior art procedures, has been eliminated together with the costly solvent recovery steps, which were implicit in the prior art procedures.

More particularly, the process of this invention involves reacting ultra high purity hexachlorocyclopentadiene and maleic anhydride at an elevated temperature for a period of time sufficient to complete the adduction. The reaction product is then poured into shallow trays, dried in a vacuum oven if necessary, and cooled to ambient temperature to solidify. The solid cake of chlorendic anhydride is reduced to particulate form, e.g., by grinding.

DETAILED DESCRIPTION OF THE INVENTION

In accordance with a preferred mode of carrying out the process of the present invention, a mixture of one molar proportion of ultrahigh purity hexachlorocyclopentadiene and about 1.01 to about 1.1 molar proportions of maleic anhydride is heated at about 140° to about 160° centigrade. Preferably the reaction mixture contains a small amount, less than about 10 percent by weight of the mixture, and especially about 4 to about 6 percent by weight, of an organic solvent boiling in the range of from about 110° to about 180° centigrade. The resulting mixture is maintained at the reaction temperature for a sufficient period to permit substantially complete reaction, usually from about 3 to about 30 hours and then the mixture is poured into drier trays in relatively thin layers. The mass is heated in a oven, preferably under subatmospheric pressure, to remove volatile constituents e.g., solvent if present, unreacted hexachlorocyclopentadiene, and the like.

The process of this invention utilizes hexachlorocyclopentadiene in a highly purified state, i.e., "ultra-high purity" hexachlorocyclopentadiene. In such a state, this component contains at least about 98 percent and preferably 99.9 percent or more, of hexachlorocyclopentadiene and about 0.02 percent or less of hexachlorobutadiene and 0.02 percent or less of octachlorocyclopentadiene. The purification of crude hexachlorocyclopentadiene can be effected by methods known in this art. For example, the crude can be distilled through a two foot column packed with glass tubing, Raschig rings or the like, under a vacuum of about 20 mm pressure to obtain an ultra-high pure hexachlorocyclopentadiene fraction boiling at about 125° centigrade and analyzing more than 98 percent, and as high as 99.95 + percent, by weight of hexachlorocyclopentadiene. Such an ultra-high purified material is eminently suitable for use in the process of this invention.

A small excess of maleic anhydride over that molar proportion required to react with the hexachlorocyclopentadiene is desirable to insure complete reaction and to assist in maintaining the reaction mass fluid at the elevated temperature of the reaction. The excess, expressed in molar equivalent proportions, may be as little as 0.01 mole and as high as 0.1 mole but is preferably from 0.02 to 0.05 mole per mole of hexachlorocyclopentadiene. The reactants can be mixed in any convenient order, either hexachlorocyclopentadiene may be added to the molten anhydride or the latter, preferably in molten condition, charged to the heated hexachlorocyclopentadiene.

It is preferred to carry out the condensation reaction in the presence of a small quantity, about ten percent by weight or less, of a relatively high boiling organic solvent. The solvent functions primarily to maintain the condensation reaction mass fluid at the reaction temperature and is substantially completely removed during the vacuum heating step. In general, only about 4 to about 6 percent of the organic solvent is required. Organic solvents having normal boiling points of from about 110° to about 180° centigrade are suitable. Typical of such solvents include toluene, o- and m- xylene, and mixtures thereof, monochlorobenzene, o-dichlorobenzene, m-dichlorobenzene, p-dichlorobenzene and mixtures thereof. Monochlorobenzene, in an amount of about 4 to about 6 percent by weight of the reaction mass, is preferred for reasons of general effectiveness, availability, reasonable cost, and ease of removal.

Although a reaction temperature from about 110° to about 180° centigrade is effective, it is preferred to carry out the condensation reaction at a temperature from about 140° to about 160° in order that the reaction may proceed at an economical rate. At temperatures above about 180° centigrade, the color of the resultant chlorendic anhydride may become unsatisfactory for use in the preparation of high grade polyester resins and the reverse Diels Alder reaction apparently occurs with concomitant color formation.

Following completion of the condensation reaction, the molten reaction mixture is run into trays. The mass solidifies on cooling and preferably it is cast in relatively thin layers, e.g., from one half to about 2 inches thick. The mass is then placed in a vacuum oven and held therein to remove, substantially completely, solvent if present, unreacted hexachlorocyclopentadiene, unreacted maleic anhydride, and other volatile materials. Following removal from the vacuum oven, the product can be ground or otherwise reduced to particulate condition, and can be used directly, i.e., without further purification or treatment for the preparation of high quality polyester resins. The resultant product is usually obtained substantially free from unreacted hexachlorocyclopentadiene, organic solvent and chlorendic acid.

The following examples illustrate the process of our invention but it is to be understood that the specific details set out in the examples have been chosen for the purpose of illustration and are not intended to limit our invention. In this specification and claims appended hereto, as well as the examples, parts and percentages are by weight and temperatures are given in degrees centigrade unless otherwise specified.

EXAMPLE I

A mixture of 300 parts (1.05 moles) of ultra-high purity hexachlorocyclopentadiene (99.95% $C_5Cl_6$) and 21 parts of monochlorobenzene was heated to and maintained at 144°. To this mixture, 110 parts of molten (about 60° maleic anhydride (1.12 moles) was gradually added, over a period of about 140 minutes, while maintaining the reaction mixture at 141° to 156°. The mixture was maintained at about 148° for 22 ¼ hours and then poured into shallow aluminum drier trays. The trays were filled to the height of about one and one half inches. The product crystallized to a solid mass in the trays which were then placed in a vacuum oven and heated therein at about 134° under a vacuum of about 25 mm of mercury for 4 hours. The resultant chlorendic anhydride contained less than 0.1 percent free hexachlorocyclopentadiene, less than 0.05 percent monochlorobenzene, less than 2.0 percent chlorendic acid, and had only a slight odor.

EXAMPLE II

To 819 parts (3 moles) of ultra-high purified (99.95 + percent) hexachlorocyclopentadiene, heated to 145°, a mixture of 303 parts (3.092 mole) of maleic anhydride and 57.1 parts of monochlorobenzene was added in about 1 hour while increasing the temperature of the reaction mixture to 155°. The mass was maintained at 150° to 152° for about 5 hours while gently agitating the mixture. The mass was run into a glass tray lined with aluminum foil and heated about 165° in a vacuum of about 26.5 inches of mercury for about 2 hours. The resultant product, chlorendic anhydride, was essentially odor free and contained less than 0.01 percent free hexachlorocyclopentadiene, less than 0.05 percent monochlorobenzene and less than two percent chlorendic acid. The product was eminently suitable for the preparation, directly, of high quality polyester resins.

The present invention has been described in the above specification and examples with reference to several specific embodiments. Such reference has been made for purely illustrative purposes and various modifications in the details included therein can be without departing from the scope or spirit of the invention, as will be obvious to those skilled in this art.

What is claimed is:

1. The process of preparing chlorendic anhydride which comprises:
   a. reacting a mixture of ultra-high purity hexachlorocyclopentadiene containing at least about 98 percent by weight of hexachlorocyclopentadiene and maleic anhydride, the latter being present in an amount which is about 1 to about 10 mol percent excess, said mixture containing less than about 10 percent by weight of liquid chlorinated benzene boiling between about 110° and about 180° centigrade,
   b. heating said mixture at a temperature of from about 110° to about 180° centigrade until substantially complete reaction has taken place,
   c. drying the reaction mixture at an elevated temperature and under subatmospheric pressure, and
   d. separating the resultant chlorendic anhydride product in a form substantially free from unreacted hexachlorocyclopentadiene and liquid chlorinated benzene.

2. The process of claim 1 wherein step (b) is carried out at a temperature from about 140° to 160° centigrade.

3. The process as claimed in claim 1 wherein the liquid chlorinated benzene is monochlorobenzene.

4. The process as claimed in claim 3 wherein the monochlorobenzene is present in the amount of from about 4 to about 6 percent by weight.

5. The process of claim 2 in which the ultra-high purity hexachlorocyclopentadiene contains at least 99.9 percent by weight of hexachlorocyclopentadiene.

6. The process of preparing chlorendic anhydride which comprises
   a. reacting a mixture of ultra-high purity hexachlorocyclopentadiene containing at least about 99.9 percent by weight of hexachlorocyclopentadiene and maleic anhydride, the latter being present in an amount which is about 2 to about 5 mol percent excess, said mixture containing about 4 to about 6 percent by weight of monochlorobenzene,
   b. heating said mixture at a temperature of from about 140° to about 160° centigrade until substantially complete reaction has taken place,
   c. transferring the reaction mixture to shallow pans and heating said mixture at an elevated temperature and under subatmospheric pressure, and
   d. separating the resultant chlorendic anhydride product in a form substantially free from unreacted hexachlorocyclopentadiene and monochlorobenzene.

* * * * *